United States Patent [19]

Schwarzbach

[11] Patent Number: 5,308,500

[45] Date of Patent: May 3, 1994

[54] REMOVAL FROM INDUSTRIAL WASTEWATERS OF METALS THAT FORM SPARINGLY SOLUBLE SULFIDES

[75] Inventor: Joerg Schwarzbach, Ludwigshafen, Fed. Rep. of Germany

[73] Assignee: BASF Aktiengesellschaft, Ludwigshafen, Fed. Rep. of Germany

[21] Appl. No.: 935,168

[22] Filed: Aug. 26, 1992

[30] Foreign Application Priority Data

Aug. 27, 1991 [DE] Fed. Rep. of Germany ....... 4128353

[51] Int. Cl.$^5$ ................................................ C02F 1/62
[52] U.S. Cl. ..................... 210/716; 210/724; 210/728; 210/912; 210/914
[58] Field of Search .............. 210/716, 717, 724, 726, 210/728, 912, 913, 914

[56] References Cited

U.S. PATENT DOCUMENTS

| | | | |
|---|---|---|---|
| 3,740,331 | 6/1973 | Anderson | 210/912 |
| 4,102,784 | 7/1978 | Schlauch | 210/716 |
| 4,422,943 | 12/1983 | Fender et al. | 210/914 |
| 4,940,549 | 7/1990 | Olsen et al. | 210/912 |
| 5,200,082 | 7/1993 | Olsen et al. | 210/912 |

FOREIGN PATENT DOCUMENTS

| | | |
|---|---|---|
| 0349671 | 1/1990 | European Pat. Off. |
| 3917412 | 12/1990 | Fed. Rep. of Germany |
| 3001497 | 1/1988 | Japan |

OTHER PUBLICATIONS

Database WPIL, AN-76-50918X, & JP-A-51 057 687, May, 21 1976.

Primary Examiner—Peter A. Hruskoci
Attorney, Agent, or Firm—Oblon, Spivak, McClelland, Maier & Neustadt

[57] ABSTRACT

Metals that form sparingly soluble sulfides are removable from industrial wastewaters by adding a precipitant comprising a suspension obtained by mixing sulfur, an iron(II) salt, water and a base, adjusting the wastewater pH to >4, and separating off the resulting sulfidic precipitate in a conventional manner.

6 Claims, No Drawings

REMOVAL FROM INDUSTRIAL WASTEWATERS OF METALS THAT FORM SPARINGLY SOLUBLE SULFIDES

The present invention relates to an improved process for removing metals that form sparingly soluble sulfides from industrial wastewaters by adding a precipitant and subsequently separating off the resulting precipitate.

Examples of metals that form sparingly soluble sulfides are mercury, silver and in particular copper.

Especially copper-containing wastewaters are obtained in electroplating and in particular in the synthesis of pigments or dyes such as copper phthalocyanines or copper formazans and they additionally contain, in particular in the case of pigment synthesis, complexing agents such as phthalic anhydride and phthalimide, respectively used as starting material for the synthesis and obtained as intermediate, and ammonium ions, which are formed from the urea formed in the course of the synthesis and which keep the copper ions in solution and thus make their removal appreciably more difficult.

The copper content of these wastewaters is in general about 500–3000 ppm. However, for wastewater to be treatable in a water treatment plant the copper content should not exceed 0.5 ppm. Consequently, the copper levels of these wastewaters must be distinctly lowered.

JP-A2-1497 (1988) discloses a process for removing heavy metals such as mercury or copper by first adjusting the pH of the wastewater to about 4 and then adding sulfur powder and a reducing agent such as iron(II) oxalate or thiosulfate directly without prior mixing as precipitant. However, the disadvantages of this process are high precipitant excess (from 200 to 3000 times the stoichiometric amount) and the several hours' stirring required to complete the precipitation.

It is also known to remove these metals by using iron(II) sulfide as precipitant in solid form or, as described in U.Ss. Pat. No. 4 102 784, in the form of aqueous suspensions obtained by adding iron(II) salts such as iron(II) sulfate to solutions of water soluble sulfides such as sodium sulfide. However, this has the disadvantage that it is easy for the unwanted hydrogen sulfide to evolve and that the pH of the precipitant-wastewater mixture must therefore be strictly controlled and alkaline.

It is an object of the present invention to remove metals that form sparingly soluble sulfides from industrial wastewaters in a simple, economical and ideally quantitative manner without evolution of hydrogen sulfide.

We have found that this object is achieved by a process for removing metals that form sparingly soluble sulfides from industrial wastewaters by adding a precipitant and subsequently separating off the resulting precipitate, which comprises adding as precipitant a suspension obtained by mixing sulfur, an iron(II) salt, water and a base, adjusting the wastewater pH to >4–8, and separating off the resulting sulfidic precipitate in a conventional manner.

The molar ratio of iron(II) salt to sulfur in the suspension precipitant can be varied within wide limits, but in general it is from 0.5:1 to 10:1, preferably from 1.5:1 to 4:1, particularly preferably about 2:1. Depending on the precipitations that occur, for example in the course of a partial reduction of the metal to be removed, the stoichiometric sulfur requirement may also decrease to a molar ratio of about 3:1–4:1.

The process of the invention can in principle be carried out with any known soluble inorganic iron(II) salt. For cost reasons it is preferable to employ for example iron(II) chloride and in particular iron(II) sulfate, an industrial waste product in the production of titanium dioxide.

The sulfur is advantageously used in powder form. It is particularly advantageous to use wettable sulfur, a readily dispersible mixture of sulfur powder and a surfactant such as ligninsulfonate. But conventional ground sulfur is also highly suitable.

The process of the invention can be carried out for example by first stirring the sulfur and the iron(II) salt with a little water. This mixture is then brought to pH of at least 5 by adding to it a base such as, in particular, sodium hydroxide solution or else potassium hydroxide solution, water of lime, milk of lime or sodium carbonate.

The pH of the mixture is not critical as such, but it must be >5 in order that the following reaction, discernible from the increasing blackening of the resulting suspension, may take place:

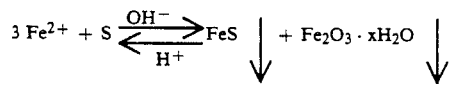

If the reaction mixture has been excessively diluted with water or if an excessively dilute base has been used (it is advisable to use about 50% strength by weight sodium hydroxide solution), the reaction will be slower and it will be necessary to stir longer and if necessary even with heating to about 50°–80° C. After the reaction has ended, the suspension can be diluted with water or base in any proportion.

The iron(II) sulfide FeS freshly formed in the suspension is highly effective in precipitating the sulfides of the metals to be removed. Since the FeS is present in equilibrium with similarly formed iron(III) hydroxides $FeO_3 \cdot xH_2O$, which act as scavengers for hydrogen sulfide, the evolution of hydrogen sulfide on addition of acids is kept under control by the reverse reaction of the above-illustrated equation.

The suspension precipitant of the invention is in general used in such amounts that for every mole of a divalent metal to be removed at least 1 mol of sulfur and at least 2 mol of iron(II) salt are used and for every mole of a monovalent metal to be removed at least 0.5 mol of sulfur and at least 1 mol of iron(II) salt. Unnecessarily large excesses are of course undesirable for economic reasons.

The process of the invention is conveniently carried out as follows:

The suspension precipitant and the wastewater to be treated are added together, preferably after heating to about 50°–70° C., in either order.

However, the precipitation can also be carried out not only at low temperatures, for example at room temperature, but also at high temperatures, for example as high as the boiling point of the mixture.

The pH of the mixture is then adjusted to a value >4, generally from 5 to 10, preferably from 6 to 9, by addition of one of the abovementioned bases. Particularly preferred pH ranges depend on the particular wastewater used.

The sulfidic precipitate, obtained in a readily filterable form, can in general be immediately separated off by customary filtration. Prolonged stirring is not necessary.

In the practice of the process of the invention it is advantageous to avoid overly free access of air. This applies in particular to the preparation of the suspension precipitant, since otherwise iron(II) is oxidized to iron(III) and will no longer be available for the formation of iron(II) sulfide. But the rest of the process is also advantageously carried out under protective gas, for example nitrogen.

The process of the invention is customarily carried out under atmospheric pressure, but it can also be carried out under superatmospheric pressure.

It can be carried out not only batchwise but also continuously.

A preferred embodiment of the process of the invention concerns the continuous removal of copper. The suspension precipitant is in this case continuously metered into the wastewater from a reservoir vessel. The rate of addition is controlled via the autogenous redox potential of the reaction mixture, which depends inter alia on the copper content and the pH of the mixture and must be determined individually for each wastewater. The redox potential can for example be measured against a silver/silver chloride electrode.

A particularly preferred use of the process of the invention consists in the removal of metals that form sparingly soluble sulfides from industrial wastewaters that contain complexing agents. Even in the presence of strong complexing agents it is possible to lower the residual metal contents to below 0.5 ppm.

Also of advantage are the low costs of the process of the invention, resulting from the use of inexpensive precipitant constituents in almost stoichiometric amounts only. The sulfidic precipitate obtained according to the invention therefore contains the removed metal in such concentrations that recovery becomes worthwhile and expensive landfilling of the precipitate is obviated.

The process of the invention avoids the evolution of hydrogen sulfide. Moreover, precipitation is extremely quick, making prolonged stirring unnecessary. The process of the invention is therefore particularly highly suitable for practice as a continuous process.

EXAMPLES

Examples 1 to 8

To a mixture of a mol of the iron(II) salt and b mol of wettable sulfur (80% by weight of sulfur, 20% by weight of ligninsulfonate; calculated on 100% by weight of sulfur) were added c mol of 50% strength by weight sodium hydroxide solution with stirring. The black suspension formed exothermically was diluted with d ml of water.

To e g of this suspension precipitant were added 100 g of a wastewater obtained as described in Example 1 of DE-A-31 06 541 from the purification, by boiling with dilute sulfuric acid, of the copper phthalocyanine synthesized by the urea-phthalic anhydride process, containing inter alia 1500 ppm of copper, 0.5% by weight of ammonium and 0.17% by weight of organically bound nitrogen and having a pH of 0.7.

After heating to 50° C. the pH of the mixture was adjusted to the value W by addition of 50% strength by weight sodium hydroxide solution. The precipitate was filtered off at once.

Quantitative determination of the residual copper content of the filtrate was carried out in a conventional manner by atomic absorption spectroscopy.

Details of these experiments and their results are revealed in Table 1.

TABLE 1

| | Suspension precipitant | | | | | | Filtrate residual copper content [ppm] |
|---|---|---|---|---|---|---|---|
| Ex. | a mol of iron(II) salt A | b mol of S | c ml of 50% by weight NaOH | d ml of H$_2$O | amount used e/g | Mixture pH W | |
| 1 | 0.057 FeSO$_4$.7H$_2$O | 0.028 | 30 | 20 | 8.2 | 6 | <0.5 |
| 2 | 0.066 FeSO$_4$.7H$_2$O | 0.028 | 30 | 20 | 8.5 | 6 | <0.5 |
| 3 | 0.057 FeSO$_4$.7H$_2$O | 0.014 | 30 | 20 | 8.1 | 6 | 0.5 |
| 4 | 0.057 FeSO$_4$.7H$_2$O | 0.019 | 30 | 20 | 8.2 | 6 | <0.5 |
| 5 | 0.057 FeSO$_4$.7H$_2$O | 0.023 | 30 | 20 | 8.2 | 6 | <0.5 |
| 6 | 0.057 FeSO$_4$.7H$_2$O | 0.033 | 30 | 20 | 8.2 | 6 | 0.5 |
| 7 | 0.062 FeCl$_2$.4H$_2$O | 0.034 | 50 | 50 | 14.0 | 7.3 | 0.4 |
| 8* | 0.151 FeCl$_2$.4H$_2$O | 0.093** | 100 | — | 4.6 | 6 | 0.3 |

*the wastewater used contained 1080 ppm of copper, 140 ppm of molybdenum and 0.23% by weight of ammonium
**ground sulfur (99% by weight) was used

Example 9

70 g (0.246 mol) of iron(II) sulfate heptahydrate and 4 g (0.124 mol) of ground sulfur (99% by weight) were suspended in 110 g of water and 60 g of 50% by weight sodium hydroxide solution were added to prepare with exothermic heating to 60°–70° C. a suspension for use as precipitant.

Furthermore, a model wastewater was prepared by dissolving 5.02 g (0.031 mol) of anhydrous copper sulfate and 12 g (0.036 mol) of disodium ethylenediaminetetraacetate (Na$_2$EDTA) in water, adding 50 g of concentrated sulfuric acid and making up with water to 1000 g (copper content: 2000 ppm).

200 g of this model wastewater were heated to 50° C. and 1/10 of the suspension was added. The pH was then adjusted to 9 with 50% by weight sodium hydroxide solution. The precipitate was filtered off after 5 min.

All the steps were carried out under a protective gas (nitrogen).

The filtrate contained >0.1 ppm (determined by atomic absorption spectroscopy).

Comparative Example

The decoppering of the model wastewater of Example 9 was carried out not with the aid of a suspension precipitant according to the invention but by direct addition of sulfur and iron(II) sulfate.

To this end, 200 g of the model wastewater were heated to 50° C., 0.4 g of ground sulfur and 7.0 g of iron(II) sulfate heptahydrate were added, and the pH was adjusted to 9 with 50% by weight of sodium hydroxide solution. The precipitate was filtered off after 5 min. Again nitrogen was employed as protective gas.

The filtrate contained 9 ppm of copper (atomic absorption spectroscopy).

Examples 10 and 11

To 2.9 g of the suspension precipitant of Example 8 were added 100 g of a 0.01M mercury(II) chloride solution acidified to pH 0.5 with sulfuric acid. After heating to 60° C. the pH of the mixture was adjusted to W with 50% by weight sodium hydroxide solution. The precipitate was filtered off at once.

The pH settings and the residual mercury contents of the filtrates determined by atomic absorption spectroscopy are shown in Table 2.

TABLE 2

| Example | pH W of mixture | Residual mercury content of filtrate [ppm] |
|---|---|---|
| 10 | 5 | 0.2 |
| 11 | 6 | 0.01 |

We claim:

1. A process for removing metals that form sulfides which precipitate from industrial wastewaters by adding a precipitant and subsequently separating off the resulting precipitate, which consists essentially of adding as precipitant a suspension having a pH $\geq 5$, obtained by mixing sulfur, from 0.5 to 10 mol an iron(II) salt, for each mol of sulfur, water and a base, wherein iron(II) sulfide is present in said suspension in equilibrium with iron(II) hydroxides adjusting the wastewater pH to $\geq 4$, to form a sulfidic precipitate containing said metals and separating off said sulfidic precipitate.

2. A process as claimed in claim 1, wherein the suspension precipitant contains from 1.5 to 4 mol of iron(II) salt per mole of sulfur.

3. A process as claimed in claim 1, wherein the added suspension precipitant contains
   a) at least 1 mol of sulfur per mole of metal if the metal to be removed is divalent, or
   b) at least 0.5 mol of sulfur per mole of metal if the metal to be removed is monovalent.

4. A process as claimed in claim 1, wherein the added suspension precipitant contains
   a) at least 2 mol of iron(II) salt per mole of metal if the metal to be removed is divalent, or
   b) at least 1 mol of iron(II) salt per mole of metal if the metal to be removed is monovalent.

5. A process as claimed in claim 1, wherein the iron(II) salt used is iron(II) sulfate or iron(II) chloride.

6. A process as claimed in claim 1, wherein said metals are removed from industrial wastewaters that contain complexing agents.

* * * * *